US010990883B2

(12) United States Patent
Hui et al.

(10) Patent No.: US 10,990,883 B2
(45) Date of Patent: Apr. 27, 2021

(54) SYSTEMS AND METHODS FOR ESTIMATING AND/OR IMPROVING USER ENGAGEMENT IN SOCIAL MEDIA CONTENT

(71) Applicant: Mashwork Inc., New York, NY (US)

(72) Inventors: Sam K. Hui, Bellaire, TX (US); Jared A. Feldman, New York, NY (US)

(73) Assignee: Mashwork Inc., New York, NY (US)

( * ) Notice: Subject to any disclaimer, the term of this patent is extended or adjusted under 35 U.S.C. 154(b) by 800 days.

(21) Appl. No.: 15/695,622

(22) Filed: Sep. 5, 2017

(65) Prior Publication Data

US 2019/0073596 A1    Mar. 7, 2019

(51) Int. Cl.
| | |
|---|---|
| *G06N 5/04* | (2006.01) |
| *H04L 12/58* | (2006.01) |
| *G06N 20/00* | (2019.01) |
| *H04W 4/21* | (2018.01) |
| *H04L 29/08* | (2006.01) |

(52) U.S. Cl.
CPC ............ *G06N 5/04* (2013.01); *G06N 20/00* (2019.01); *H04L 51/32* (2013.01); *H04L 67/146* (2013.01); *H04L 67/22* (2013.01); *H04W 4/21* (2018.02)

(58) Field of Classification Search
CPC .......... G06N 5/04; G06N 20/00; H04W 4/21; H04L 51/32; H04L 67/146; H04L 67/22
See application file for complete search history.

(56) References Cited

U.S. PATENT DOCUMENTS

| | | | | |
|---|---|---|---|---|
| 10,140,552 | B2* | 11/2018 | Steiner | ............... G06K 9/6267 |
| 2004/0230477 | A1* | 11/2004 | Alvarez | ............ G06Q 30/0242 |
| | | | | 705/14.41 |
| 2014/0122622 | A1* | 5/2014 | Castera | ................... H04L 51/04 |
| | | | | 709/206 |
| 2019/0347571 | A1* | 11/2019 | Qadir | ..................... G06N 20/00 |

OTHER PUBLICATIONS

Grace-Martin, Generalized Ordinal Logistic Regression for Ordered Response Variables, Jul. 13, 2016 (Year: 2016).*
Barlett, "The Square-Root Transformation in Analysis of Variance", Supplement to the Journal of the Royal Statistical Society, vol. 3, No. 1 (1936), pp. 68-78.

(Continued)

*Primary Examiner* — Kamran Afshar
*Assistant Examiner* — Ryan C Vaughn
(74) *Attorney, Agent, or Firm* — Nixon & Vanderhye, P.C.

(57) ABSTRACT

Certain example embodiments described herein relate to techniques for determining the effectiveness of social media content posted to a particular network location. An example technique includes receiving a set of social media content records posted to a network location and one or more user reaction records posted in response to the social media content record, associating at least one emotion token with each received user reaction record, assigning at least one emotion category to each social media content record, obtaining one or more engagement metrics for each social media content record, and determining a relationship between at least one engagement metric and at least one emotion category based upon the obtained one or more engagement metrics and the assigned at least one emotion category of respective social media content records in the set.

14 Claims, 8 Drawing Sheets

(56) References Cited

OTHER PUBLICATIONS

Bendel et al., "Comparison of Stopping Rules in Forward Stepwise Regression", Journal of the American Statistical Association, vol. 72, No. 357 (Mar. 1977), pp. 46-53.
Berk, K.N. "Comparing Subset Regression Procedures", Technometrics, vol. 20, No. 1 (Feb. 1978), pp. 1-6.
Box et al., "An Analysis of Transformations", Journal of the Royal Statistical Society, Series B, 1964, 26(2), pp. 211-252.
Everitt et al., The Cambridge Dictionary of Statistics, $2^{nd}$ Edition, 2002.
Gatu et al., "Branch-and-Bound Algorithms for Computing the Best-Subset Regression Models", Journal of Computational and Graphical Statistics, vol. 15, No. 1 (Mar. 2006), pp. 139-156.
Hastie et al., "Forward Stagewise Regression and the Monotone Lasso", Electronic Journal of Statistics, vol. 1 (2007) pp. 1-29.
Haykin, Simon, "Neural Networks" A Comprehensive Foundation, $2^{nd}$ Edition, ISBN 81-7808-300-0, pp. 1-823.
Johnstone et al., "Statistical Challenges of High-Dimensional Data", Philosophical Transactions of the Royal Society A (2009), vol. 367, pp. 4237-4253.
Pope et al., "The Use of a F-statistics in Stepwise Regression Procedures", Technometrics, vol. 14, No. 2 (May 1972), pp. 327-340.
Suykens et al., "Least Squares Support Vector Machine Classifiers", Neural Processing Letters vol. 9, pp. 293-300, 1999.
Tong et al., "Support Vector Machine Active Learning with Applications to Text Classification", Journal of Machine Learning Research, vol. 2 (Nov. 2001), pp. 45-66.

\* cited by examiner

200

| Nervous | Not scary | Happy | Awkward |
|---|---|---|---|
| Afraid | Funny | Boring | Disgusting |
| Annoying | Idiot | Goosebumps | Cried |
| Sentimental | Love | Ugly | FML |
| Thrilling | Weird | Lucky | Angry |
| Interesting | Beautiful | Looks Good | Fake |
| Crazy | Worried | Badass | Excited |
| Unsure | Supportive | Sad | Hate |
| Enjoy | Embarrassing | Brutal | Not Funny |
| Disappointed | Rage | Jealous | Congrats |
| Dislike | Brilliant | | |

| Category | Tokens |
|---|---|
| Nervous | • Stressed<br>• Nail biter<br>• Under pressure |
| Afraid | • Scary<br>• Won't be able to sleep<br>• Terrified |
| Annoying | • Who cares<br>• Bratty<br>• Ugh |
| Interesting | • Fascinate<br>• Thought provoking<br>• I'm curious |
| Crazy | • Is this real life<br>• Intense<br>• Wow |
| Unsure | • On the fence<br>• Confuse<br>• Idk about |
| Beautiful | • Attractive<br>• Adorable<br>• Fine as hell |
| Happy | • Brighten my day<br>• Fills my heart with joy<br>• Glad |
| Boring | • Lame<br>• Not blown away<br>• Dull |
| Cried | • Teary eyed<br>• Bawling<br>• Weeping |

- 402 — Web address: www.facebook.com/RealHousewivesofBeverlyHills
- 404 — Number of posts = 294
- 406 — Ordered set of emotional categories
  i. Dislike (-) (*priority emotion)
  ii. Annoying (+)
  iii. Boring (-)
- 408 — Estimated coefficient for the priority emotion: -1.43% (For 1% increase in "dislike", we expect 1.43% decrease in expected reach).
- 410 — Part vs. whole test: "Passed"
- 412 — Overall median reach = 207,362
- 414 — Median reach of "top 5" post, ordered by % priority emotion = 23,238 (-88.79% compared to overall median)

FIG. 4

SYSTEMS AND METHODS FOR ESTIMATING AND/OR IMPROVING USER ENGAGEMENT IN SOCIAL MEDIA CONTENT

TECHNICAL FIELD

Certain example embodiments described herein relate to techniques for estimating and/or improving user engagement in content posted on social media networks. More particularly, certain example embodiments relate to techniques to estimate a relationship between posted social media content and corresponding user reactions and the effect of user reactions upon user engagement with posted social media content.

BACKGROUND

Social media systems are pervasive throughout modern society. Social media platforms such as Facebook®, Twitter®, Youtube®, blogs, Instagram® and the like, exist entirely on, and because of, the Internet. They present corporations and other entities with opportunities and problems that have no parallel outside of the computer networks on which they exist. Entities such as corporations and individuals use social media platforms to engage in conversations and to convey their views to their respective audiences. Companies extensively use social media platforms, such as those mentioned above, to advertise products and services, to convey their views on certain social and other issues, etc. In the various social media systems, an initial post of some particular content by a user or company often causes other users accessing that content to react by posting one or more comments associated with the initial post. The reactions of users to the various posts made to social media platforms by a corporation can yield information of high value.

The continuing growth of accessibility to the Internet in populations throughout the world, and the continued growth in both the number of people using mobile devices to access the Internet and the frequency with which people use mobile devices and the like to access the Internet, are driving an explosive growth in the level of engagement an entity's audience has with that entity's social media presence. Corporations and other entities now compete for "eyeballs" on their social media presence. As the manner in which audiences consume advertising and other information shifts away from conventional avenues such as radio, television, newspapers and other print media, to social media platforms, it becomes more important that corporations and other entities have effective techniques by which to efficiently and accurately determine the level of user engagement associated with their social media presence.

SUMMARY OF EXAMPLE EMBODIMENTS OF THE INVENTION

Certain example embodiments described herein relate to techniques for determining the effectiveness of social media content posted to a particular network location. The techniques derive a relationship between posted social media content and emotions expressed in the user reactions to that posted content.

According to an embodiments, a system for determining effectiveness of content posted on a social media network is provided. The system comprises a memory, a network communication interface, and a processor. The processor is configured to, in conjunction with the memory and the network communication interface, perform operations including, (a) receiving a set of social media content records posted to a network location and, for each social media content record in the set, one or more associated user reaction records posted in response to the social media content record; (b) associating at least one emotion token from an emotion token database with each received user reaction record; (c) assigning, to each social media content record in the set and in accordance with the at least one emotion token associated with said each social media content record, at least one emotion category from an emotion category database; (d) obtaining one or more engagement metrics for each social media content record in the set, wherein each engagement metric represents a performance parameter of said each social media content record; (e) determining, based upon the obtained one or more engagement metrics and the assigned at least one emotion category of respective social media content records in the set, a relationship between at least one engagement metric and at least one emotion category; and (f) outputting the determined relationship.

Another embodiment provides a method including (1) receiving a set of social media content records posted to a network location and, for each social media content record in the set, one or more associated user reaction records posted in response to the social media content record; (b) associating at least one emotion token from an emotion token database with each received user reaction record; (c) assigning, to each social media content record in the set and in accordance with the at least one emotion token associated with said each social media content record, at least one emotion category from an emotion category database; (d) obtaining one or more engagement metrics for each social media content record in the set, wherein each engagement metric represents a performance parameter of said each social media content record; (e) determining, based upon the obtained one or more engagement metrics and the assigned at least one emotion category of respective social media content records in the set, a relationship between at least one engagement metric and at least one emotion category; and (f) outputting the determined relationship.

Another embodiment provides a non-transitory computer readable storage medium having instructions stored thereon that, when executed by a computer, -cause the computer to perform operations including (a) receiving a set of social media content records posted to a network location and, for each social media content record in the set, one or more associated user reaction records posted in response to the social media content record; (b) associating at least one emotion token from an emotion token database with each received user reaction record; (c) assigning, to each social media content record in the set and in accordance with the at least one emotion token associated with said each social media content record, at least one emotion category from an emotion category database; (d) obtaining one or more engagement metrics for each social media content record in the set, wherein each engagement metric represents a performance parameter of said each social media content record; (e) determining, based upon the obtained one or more engagement metrics and the assigned at least one emotion category of respective social media content records in the set, a relationship between at least one engagement metric and at least one emotion category; and (f) outputting the determined relationship.

These aspects, features, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 2 is an example table of emotion tokens according to some example embodiments;

FIG. 3 is an example of a table of emotion categories in accordance with some example embodiments;

FIG. 4 is an example of a display output showing a relationship between a social media presence such as a Facebook® page and the emotions experienced by users, in accordance with some example embodiments;

DETAILED DESCRIPTION OF EXAMPLE EMBODIMENTS OF THE INVENTION

Figure 1:
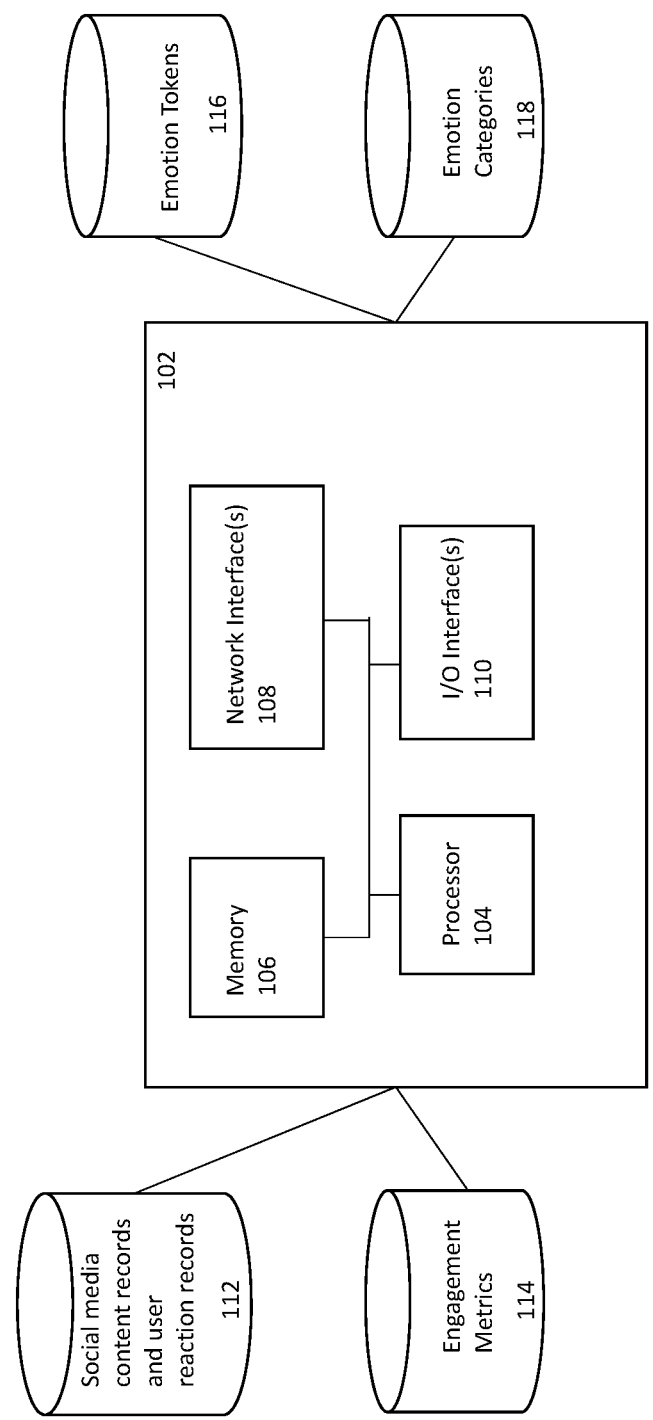
FIG. 1 is a block diagram of a system for predicting the effectiveness of social media content in accordance with certain example embodiments.

Example embodiments of the present invention provide for determining and/or using relationships between social media content postings and emotions associated with users who encounter the postings. Example embodiments enable the use of relationships between social media content postings or groups of social media content postings and emotions generated by those postings to improve the design of an entity's social media presence to more effectively achieve predetermined performance goals. For example, an embodiment of the present invention may enable a branding manager to identify an emotion reaction experienced by users accessing a company's Facebook® page, and to appropriately add, delete or change the content on the page in order to intensify or lower the identified emotion reaction. Some example embodiments quantify the effect on certain key performance indicators (also referred to as engagement metrics) caused by the emotion reaction in relation to the particular social media content postings so that the branding manager is also provided with a quantifiable way in which he or she can modify the Facebook® page to improve certain key performance indicators.

Conceptually, considering Facebook® as an example social media platform, the idea is that each "post" elicits certain emotion reactions from users, where the nature of such emotion reactions would in turn lead the user to share/like the post. The downstream consequence of sharing/liking a post is that the post would be spread to other users, who would then share/like the post etc., thereby increasing reach. Thus, example embodiments enable understanding what types of posts (in terms of certain emotion categories) would lead to more/less sharing/liking behavior.

The inventors previously created what is believed to be the first language analytics software platform that can inform users about how their audience feels about content at scale. U.S. Pat. No. 9,430,738, issued on Aug. 30, 2016, which is herein incorporated in its entirety, describes a language analytics platform for automatically categorizing and summarizing emotions expressed in social chatter by using a "knowledge base" of emotion words/phrases as an input to define a distance metric between conversations and conducting hierarchical clustering based on the distance metric. Canvs®, of New York, N.Y., offers a service utilizing technology similar to that described in U.S. Pat. No. 9,430,738, that can, among other things, report on the emotional reaction generated by television episodes.

Certain example embodiments of the present invention use, in addition to emotion tokens as in U.S. Pat. No. 9,430,738, emotion categories that are defined based upon groups of emotion tokens. Example embodiments also identify and quantify, for each social media content record (e.g., Facebook® post) and/or group of social media content records (e.g., Facebook® page), a relationship between one or more key performance metrics (also referred to as engagement metrics) and one or more emotion categories. The identified relationships can then be used in embodiments to measurably improve the effectiveness of social media content of an entity.

Certain example embodiments provide a statistical approach that derives a relationship between engagement metrics (e.g., number of likes, shares, unique impressions on Facebook®) and emotion categories of the comments on each related social post (e.g., percent of comments expressing "love", "hate", "excitement", on a Facebook® post). Given the large number of emotional categories and hence the corresponding "large-p-small-n problem" (see Hastie, Trevor, Robert Tibshirani, and Jerome Friedman (2009), The Elements of Statistical Learning: Data Mining, Inference, and Prediction, 2nd Edition, Springer), some embodiments utilize forward stagewise regression (see Hastie, Trevor, Jonathan Taylor, Robert Tibshirani, and Guenther Walther (2007), "Forward Stagewise Regression and the Monotone Lasso," *Electronic Journal of Statistics*, 1, 1-29, which is hereby incorporated by reference in its entirety) techniques to achieve shrinkage estimation of regression parameters in order to identify a set of key emotion categories that are most predictive of the selected engagement metrics. The output of the proposed technique may comprise: (i) an "ordered" set of emotion categories that are predictive of the key engagement metrics and the directionality of their relationship, (ii) a "priority" emotion indicating the most relevant emotion, and (iii) the associated estimated magnitude of the coefficient on the priority emotion. Some example embodiments may also include a follow-on statistical test to check the validity of the determined relationship in order to assess whether the identified statistical patterns should be presented to the user.

FIG. 1 is a block diagram of a system 100 for predicting the effectiveness of social media content in accordance with certain example embodiments. System 100 includes a computer 102, a source for social media content records and user reaction records 112, a source for engagement metrics 114, a database of emotion tokens 116, and a database of emotion categories 118. The computer 102 is configured to process social media content records, user reaction records and engagement metrics received as input in order to determine a relationship between the social media content records, one or more emotional reactions caused by the social media content records and one or more of the engagement metrics. According to some embodiments, the computer 102 may perform the process described in relation to FIG. 5 (discussed below). The computer 102 may comprise a processor 104, a communicating infrastructure 105 connecting the components of the computer, a memory 106, a network interface 108, and I/O interfaces 110.

The source of social media content records and user reactions 112 may be one or more databases of social media content records, social media content accessed in real time, or a combination of both. Examples of social media content records include Facebook® posts, Twitter® posts, Youtube® videos, blog postings, LinkedIn® postings, Instagram® postings and the like. The user reactions may be the responses other users post in response to the social media content records. That is, the source 112 may include, in some example embodiments, a Facebook® post made by a first user, and one or more comments posted by other users in response to that Facebook® post. In some embodiments, social media content records and corresponding user reactions can be obtained by accessing an application programming interface (API) provided by the social media platform/server.

The source of engagement metrics 114 provides engagement metric statistics associated with the social media content records of 112. Engagement metrics represent measurements of user reactions to social media content records. Example engagement metrics may include number of "likes" (e.g., of Facebook® posts, blog posts, Youtube® posts etc.), number of "retweets", etc. Some of the more commonly used engagement metrics include "number of likes", "number of shares", and "number of unique impressions", for example. Exploratory analysis suggests that these engagement metrics are highly positively correlated, as would be expected since the number of unique impressions is causally related to likes and the number of shares. In example embodiments, engagement metrics may be included for respective social media content records and/or sets of social media content records. That is, engagement metrics may, for example, include number of likes for each Facebook® post and/or for entire Facebook® pages. In some embodiments, social media content records and corresponding user reactions can be obtained by accessing an API provided by the social media platform/server. One could also access the number of unique views and shares for a Youtube® video, the number of re-tweets or response to a Twitter® post, or the view count for a video on Instagram® directly on the respective websites.

The database of emotion tokens 116 is a collection of words that are used to represent the emotions experienced by users when they access social media content. Emotion tokens may include words or phrases, and the collection of emotion tokens may include tokens that are automatically determined and/or input by operators. FIG. 2 illustrates an example table of emotion tokens in accordance with some embodiments. According to some example embodiments, the emotion token database 116 may be formed as described in U.S. Pat. No. 9,430,978 which is incorporated by reference. The database 116 may be continually grown and improved based upon actual social media posting and user reactions in order to ensure that a most current view of any trends in language use in social media platforms is captured. Automatic analysis and word extraction and/or manual techniques may be used in growing the database 116. The database may be configured to grow on a regular (e.g., daily basis) or continuously. In some embodiments, a team of human coders may go through a sample of tweets daily, and add any new emotional tokens that are not already in our token dataset. In some embodiments, an automated program using rules and heuristics may perform this task on a daily basis or on a continuous basis. In some example embodiments, the database 116 is continually updated using unsupervised learning techniques in an entirely automated manner.

The database of emotion categories 118 is a collection of emotion categories. An emotion category represents a type of emotion experienced by a user accessing social media content. The system determines emotion categories by categorizing the emotion tokens into distinct categories. The categorizing may be fully automated, for example, using an unsupervised learning technique, or may be assisted by an operator. Each emotion category may be described by at least one of the tokens in the emotion token database 116. Some emotion categories may each be described by two or more of the emotion tokens. The emotion categories database according to an example embodiment is illustrated in FIG. 3.

FIG. 3 illustrates a portion of an example table 300 of emotion categories that may be included in a database of emotion categories. As shown in table 300, each emotion category may be associated with one or more emotion tokens. There is no requirement for each emotion token to be only in one emotion category, i.e., any emotion token can be in one or more emotion categories. By grouping emotion tokens into emotion categories, embodiments enable relating social media interactions and engagement metrics to a more manageable set of emotions. For example, the second emotion category in table 300 is "afraid", which is associated with the three emotion tokens "scary", "won't be able to sleep", and "terrified". By representing the emotion tokens "scary", "won't be able to sleep" and "terrified", as included in the emotion category "afraid", the example embodiments enable distilling a potentially large number of groups (e.g., if grouped according to token use) to a more manageable number of groups. The number of emotion categories and the breadth of each emotion category (as defined by the tokens included in each category) may be determined in accordance with the collection of emotion tokens, and desired levels of a tradeoff between the preciseness of categorization of posts and the number of different groups of posts. In some example embodiments, an emotion category table of 42 emotion categories has been found to be efficient. Due to the nature of the input, the number of tokens are very large in number (e.g., in some embodiments exceeding 3,000,000 emotion tokens) and is simply too large. Grouping/clustering tokens into emotional categories cuts down dimensionality and allows one to better correlate to KPIs.

Returning to FIG. 1, computer system 102 performs the processing of the system 100. Process 104 may include one processor or more than one interconnected processors. More specifically, processor 104 receives inputs from the social media content records and user responses sources 112 and from engagement metrics sources 114, and, using the emotion categories database 118, determines relationship(s) between a social media page and/or respective posts on a social media page, and one or more of the emotion categorizations. According to some embodiments, processor 104 may execute the process 500 described in relation to FIG. 5 (below).

The memory 106 may be configured to efficiently store temporary associations between social media content records and emotion categories during execution of processes. In some embodiments, tools and platforms that are tailored for "big data" may be used. For example, some embodiments use a distributed full-text search engine that allows searching in a scalable manner.

Network interface(s) 108 are utilized by processor 102 to access the social media content records, user responses to the social media content records, and the engagement metric information. In some embodiments, the emotion tokens and/or the emotion categories databases are not local to the computer 102, and they too are accessed through the network interface(s).

I/O interface(s) 110 enable users to provide configuration information and control information via one or more of a keyboard, touchscreen, voice to text translation, etc. I/O interface 110 also enables delivery of the results of the processing performed by the processor to a screen or display. For example, an example screen that may display results of the process performed is shown in FIG. 4.

FIG. 4 illustrates a display screen 400 including the results of a process such as the process 500 described below. The information displayed may include (i) an ordered set of emotion categories that are predictive of the key engagement metrics and the directionality of their relationship, (ii) a priority emotion category indicating the most relevant emotion, and (iii) the associated estimated magnitude of the coefficient on the priority emotion category. The screen 400 shows the web address 402 of the social media content being analyzed, the number of posts 404 analyzed, the ordered set 406 of emotion categories, the estimated coefficient 408 for the priority emotion, whether the validity check was passed 410, the overall median reach 412, and the median reach of a predetermined number of the top posts ordered by percentage of priority emotion 414. With each of the emotion categories displayed, a direction of influence of that emotion category with respect to the key engagement metric may also be indicated.

In the illustrated display 400, the selected key engagement metric is user reach, and the '(−)' next to emotion category "dislike" represents that the emotion category "dislike" and the primary engagement metric are negatively correlated, e.g., increasing "dislike" is expected to result in less reach. The emotion category "annoying" is shown to positively correlate to the key performance indicator, and the emotion category "boring", like "dislike", is shown to negatively correlate to the key performance indicator. The number of emotion categories shown in the ordered list may be configurable, or it may be configured that only emotion categories that have at least a certain minimum correlation coefficient are shown in the list. Item 408 indicates the estimated regression coefficient of the priority emotion category as determined by process 500. The displayed value of −1.43% for item 408 represents that for each 1% increase in "dislike", a decrease of 1.43% in reach is expected. Items 412 and 414 show that the overall median reach when all posts on the page are considered is 207,362, and that the median reach of only the top five posts arranged according to priority emotion category is 23,238, which is only 88.79% of the overall median. This is explained by the above discussed negative correlation between the primary emotion category ("dislike" in this example) and the reach.

More example results of a process such as process 500 being performed on various social media sites are described below. The results display in FIG. 4 is exemplary, and persons of skill in the art will understand that the results may be displayed in different manners in other embodiments. The Canvs dashboard in certain example embodiments is configured for user-friendliness, and may be continually improved and refined by monitoring of usage patterns and by user feedback.

Figure 5:
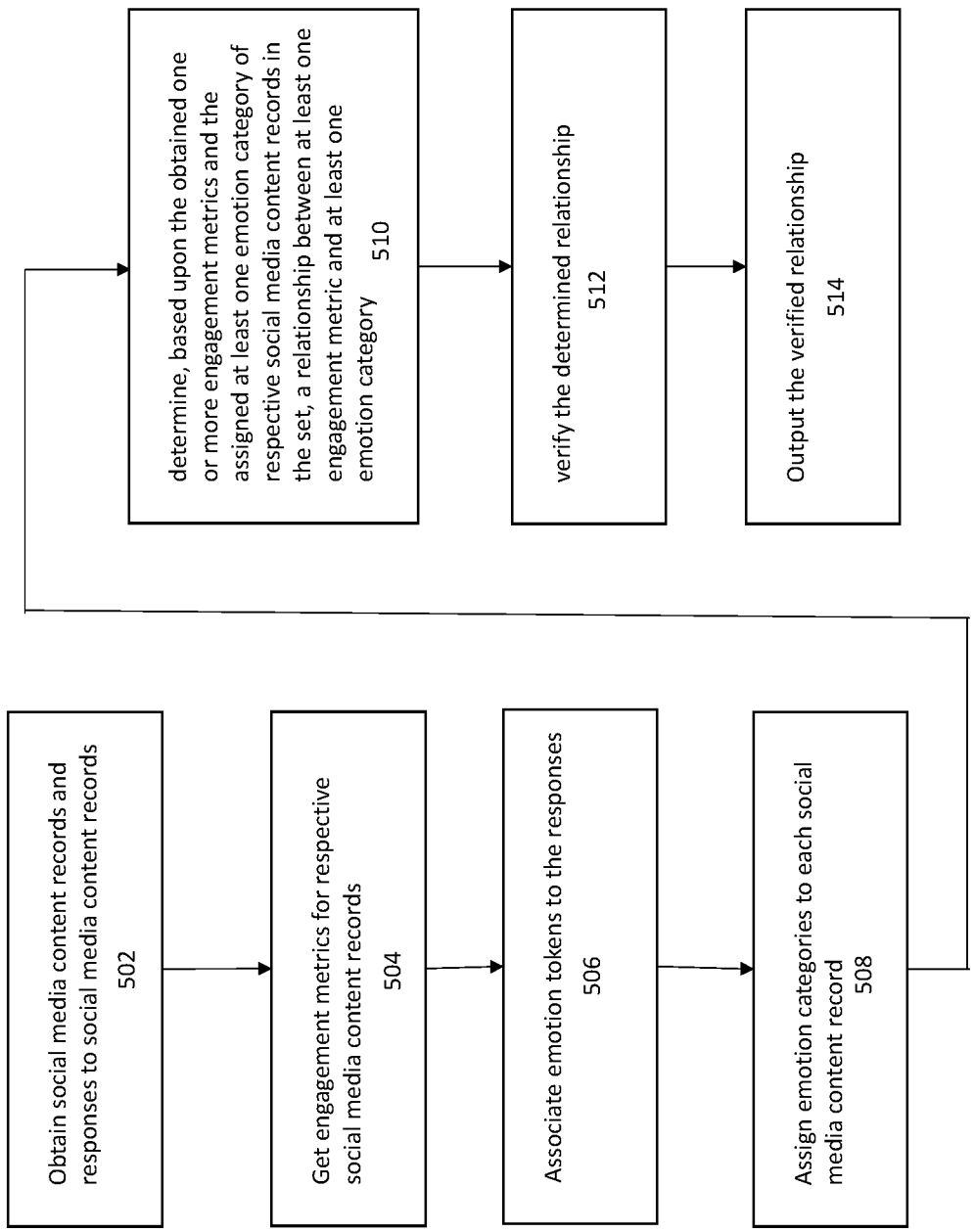
FIG. 5 illustrates a flowchart for a process for predicting the effectiveness of social media content in accordance with certain example embodiments.

FIG. 5 illustrates a flowchart for a process 500 for predicting the effectiveness of social media content in accordance with certain example embodiments. Process 500 includes operations 502-514. In certain example embodiments, process 500 may be performed on a computer system such as the computer system 100 shown in FIG. 1. In some example embodiments, the operations 502-514 may be performed in an order different from that in process 500, or may be performed with one or more additional operations or without one or more operations 502-514.

After entering the process 500, at operation 502, social media content records and corresponding user reactions are obtained. For example, at this operation in some example embodiments all the posts on one or more specified Facebook® page and corresponding posted user reactions/comments may be obtained. The social media content records and corresponding user reactions may be obtained, in some embodiments, from a database such as database of social media content records 112 which may be local to computer 102 or which may be remote and reached via network interface 108. In some embodiments, the social media content records and user reactions are obtained in response to a user input received view I/O interface 110, and in other embodiments, the same is obtained in real-time being pushed to computer 102 by an external source.

At operation 504, engagement metrics for social media content records are obtained. Engagement metrics may be obtained from a database of engagement metrics, such as database 114 which includes calculated engagement metrics for social media content records in database 112. Database 114 may be internal or external to computer 102. The engagement metrics may be precomputed.

Before entering the engagement metrics into the statistical models used in the example embodiments, it is necessary to determine what transformation to use on the raw engagement metric data in order to make it map closely to a Gaussian distribution. By modeling the data close to a Gaussian distribution, the impact of outliers can be reduced and any analysis that would be subsequently performed can be improved. For example, the system may be configured to select the use of a logarithm transformation as a variance-stabilizing transformation (e.g., see Everitt, B. S. (2002), *The Cambridge Dictionary of Statistics*, $2^{nd}$ Edition) before entering the metric as a dependent variable in the statistical model of an embodiment, if the number of unique impressions for a specific Facebook® page, as indicated by a histogram of the first impressions of all the posts of the Facebook® page, shows significant skewness. Thus, in some example embodiments, where KPI is the engagement metric, log (KPI) may be used as the key dependent variable, whether what is being analyzed is "share", "likes", or "reach". Note also that, in other example embodiments, one may consider generalizing the log-transform to any transformation that preserves monotonicity in the target variable. Such transformations may include, for example, a Box-Cox transformation (see Box, George, E. P., and D. R. Cox (1964), "An Analysis of Transformations," *Journal of the Royal Statistical Society*, Series B, 26(2), 211-252) or a square-root transformation (see Barlett Barlett, M. S. (1936), "The Square-Root Transformation in Analysis of Variance," *Supplement to the Journal of the Royal Statistical Society*, 3(1), 68-78 1936). In example embodiments, the transformation may be selected by plotting and automatically (or in some embodiments, manually) inspecting the empirical histogram of the KPI and experimenting with different-transformations to find one that is most appropriate. The selection criterion may be reduction of outliers or the like. The "best" transformation may, in certain example embodiments, determined by a data-driven approach: by specifying a Box-Cox transformation and estimating (through a brute force grid search) the corresponding optimal Box-Cox "lambda" parameter.

At operation 506, emotion tokens are associated with each user reaction that was obtained at operation 502. While the previous operation 504 focused on the dependent variable (e.g., the engagement metric), operations 506 and 508 are directed to determining predictor variables, e.g., the emotion category, of the model. At operation 506, the system extracts specific tokens from the obtained user reactions (e.g., post comments) and identifies emotion tokens from the text. Example emotion tokens may include "love", "hate", "excited", "crazy" and like words or phrases that represent emotion, as shown, for example, in FIG. 2. In example embodiments, the database of emotion tokens 114 from which the system obtains emotion tokens to match against user reactions may be continually growing and/or being modified to include new words and phrases that social media users use to convey emotion. For example, in some embodiments, the database 114 includes more than 4 million distinct tokens and their "alternative" spellings (e.g., luv, loove, looove, loooove are all different misspellings of "love").

After extracting emotion tokens from the data, at operation 508, emotion categories are assigned to the user reactions in accordance with the already assigned emotion tokens. According to some embodiments, a database of emotion categories such as database 116 may be accessed to determine the mapping from emotion tokens to emotion categories. FIG. 3 illustrates a part of a database of emotion categories. In certain example embodiments, the database of emotion categories includes forty two emotion categories identified based upon statistical analysis of emotion tokens, such as the emotion tokens in database 114. As shown in FIG. 3, for a sample of emotion categories, the distinct emotion tokens are nested within the categories. This mapping or nesting of emotion tokens in association with emotion categories, enables the system to efficiently map from emotion tokens to emotion categories and vice versa.

As a person of skill in the art would appreciate, the mapping from emotion tokens to emotion categories is non-trivial. The mapping from emotional tokens to emotions category is performed through an initial k-means clustering of the data, followed by fine-tuned modifications based on statistical models. In some embodiments, the fine-tuning may further include the use of human judgment to change the resulting mappings. According to some example embodiments, the databases 114 and 116 are subject to continual update and calibration. The continual calibration and update enables the emotion categories used in the example embodiments to reflect the most recent trends in social media. In addition to improving the accuracy of the emotion category assignments, the continual update and calibration also enables the expanding of the identified emotion categories. In terms of the update and calibration over time, at regular intervals (e.g. daily) automated programs and/or human operators go through a sample of tweets, identify the emotional tokens in the tweets, and add those emotional tokens into the database if they do not already exist. Further, the operation may also find incidences where tokens should be deemed "non-emotional" (e.g., "feel like" is non-emotional while "like" is emotional). In certain example embodiments, the update and calibration process may be assisted by a manual update. Experiments have shown that with a database of emotion categories such as a database shown in FIG. 3, the accuracy of identifying and extracting emotion is higher than 85%, which outperforms current state-of-the-art systems in both industry and academics (see e.g., Fellbaum, Christiane (2005), "WordNet and wordnets," *Encyclopedia of Language and Linguistics,* $2^{nd}$ Edition (Brown, Keith et al. Eds), Oxford).

When assigning emotion categories at operation 508, for each Facebook® post, the system extracts emotion categories for each user reaction (e.g., comment) and uses the proportion of each emotion category as an independent variable into the statistical model. The reason why proportion, rather than raw counts, is used is that more popular posts (those high on likes/share/reach) are likely to have a higher number of comments, and thus it is desirable to normalize the emotion counts with total volume in order to account for the scaling effect. In effect, by this assignment, the focus is directed to how the emotion category breakdown of each post drives the focal engagement metric. Further details of processing that may be performed in operation 508 are described below in relation to process 700.

At operation 510, based upon the obtained one or more engagement metrics and the assigned at least one emotion category of respective social media content records in the set, a relationship is determined between at least one engagement metric and at least one emotion category.

At this point, the system has extracted the emotion categories for each Facebook® post, and the structure of the input to the statistical model may be similar to data structures typically encountered in a supervised learning setting, where the data are of the form {Y, X1, X2, . . . , X42}, where Y=log-transformed KPI, X1=percent for the first emotion category, X2=percent for the second emotion category,

. . .

X42: percent for the $42^{nd}$ emotion category.

Supervised machine learning may then be employed to determine the relationship between Y and X's. Given that it is desirable for the purposes of example embodiments to estimate a marginal effect, a regression (with variable selection) framework may be used as a starting point, as opposed to a more non-parametric method such as neural networks/ deep learning (see e.g., Haykin, Simon (2004), *Neural Networks: A Comprehensive Foundation,* $2^{nd}$ Edition, Prentice Hall, Upper Saddle River, N.J.), tree-based methods (e.g., Breiman, Leo (1984), *Classification and Regression Trees,* CRC Press), or support vector machine (e.g., Suykens, J. A. K., and J. Vandewalle (1999), "Least Squares Support Vector Machine Classifers," *Neural Processing Letters,* 9(3), 293-300; Tong, Simon, and Daphne Koller (2001), "Support Vector Machine Active Learning with Applications to Text Classification," *Journal of Machine Learning Research,* 2(November), 45-66). However, some example embodiments may employ neural network-based, tree-based or support vector machine based supervised learning techniques instead of a regression technique. Further details of processing that may be performed in operation 510 are described below in relation to process 600. The supervised learning process used in some example embodiments is a variant of a class of algorithm known as "stagewise linear regression", which automatically identifies the best subset of variables that are more predictive of a certain KPI. The supervised learning process in embodiments differs from the standard stagewise linear regression implementations by also incorporating some prior knowledge about the directionality of each emotion (e.g., "love" should not be negatively related to a KPI), thereby doing a constrained optimization rather than unconstrained search. The supervised learning process of example embodiments may produce results that have higher face validity than standard techniques. The supervised learning process of example embodiments takes into account domain knowledge, rather than the standard unconstrained search in stagewise linear regression.

At operation 512, the determined relationship is verified. The verification may include checking whether the relationship determined by a predetermined learning technique at operation 510 is consistent with a light-weight check using a subset of the social media content records in the set. Process 800 described below provides further details of the verifying.

At operation 514, the verified relationship is output. The output may be to a display. An example display for displaying the output is shown in FIG. 4 for an example Facebook® page. The displayed output may be used by a brand manager or other user to improve the Facebook® page by adding, modifying or removing content in order to improve upon the selected engagement metric and identifying one or more emotion categories. For example, as described above in relation to FIG. 4, a brand manager may, upon obtaining the results shown in FIG. 4, remove or modify some content in that particular Facebook® page to reduce the effect of the "afraid" emotion category and thereby improve the reach of the page. In some example embodiments, the output may be fed into another process. For example, an output specifying the key engagement metric and primary emotion category may be input to a process which builds or automatically modifies a Facebook® page (or other page displaying a set of social media content records) by adding content previously categorized according to the various emotion categories. Another way of using this is, e.g., if it is shown that content that is received as more "funny" is positively correlated with a certain KPI (e.g., likes in Facebook®), a social media manager may want to put more promotional budget behind posts that are viewed as funny, thereby increasing the corresponding KPI. In general, our algorithm offers a more efficient way to identify and thus focus on content that is positively related to KPIs.

After operation 514, process 500 is complete. Although the above process is described while primarily using Facebook® as an example, it should be noted that the teachings are applicable to any social media platform including, but not limited to, Twitter®, Youtube®, LinkedIn®, Instagram®, blogs, etc.

Figure 6:
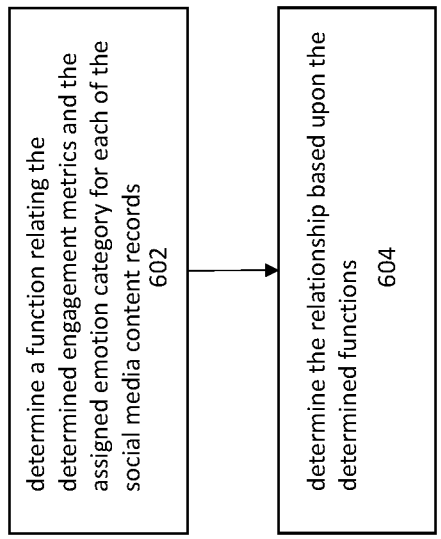
FIG. 6 is a flowchart showing supervised learning of a relationship between an engagement metric and emotion categories in accordance with certain example embodiments.

FIG. 6 is a flowchart showing a process 600 for supervised learning of a relationship between an engagement metric and emotion categories in accordance with certain example embodiments. Process 600 may be executed in certain embodiments when performing operation 510 of process 500.

After entering process 600, at operation 602, for each social media content record in the set, a function is determined relating the determined one or more engagement metrics and the assigned at least one emotion category for each of the first social media content records.

In this operation, similar to what is commonly done in settings that involve variable selection or model selection, the system may rely on the "sparseness assumption", (see Johnstone, Iain M., and D. Michael Titterington (2009), "Statistical Challenges of High-Dimensional Data," *Philosophical Transactions of the Royal Society A*, 367, 4237-4253), e.g., assume that among the emotion categories, only a small subset of them matter in driving the focal engagement metric, and that the rest of those categories would have a regression coefficient equal to 0. Under this assumption, it is desirable to search for the limited subset of emotion categories that have non-zero regression coefficients (i.e., drivers of the focal engagement metric).

The ideal output from the statistical model in example embodiments is the entire "coefficient path" of the relevant regression coefficients; that is, it is desirable to identify which variable is the most important predictor (in other words, if only one variable can be put into the model, which one would be picked?), followed by the second most important predictor, and so on. It may also be desirable to estimate the regression coefficient (primarily for the "most important" emotion category) in a manner that incorporates shrinkage, hence reducing the risk of overfitting (see Hastie et al. 2009). Overfitting is a significant risk in this setting, because a Facebook® page may not have many posts —in some cases, N can be smaller than p (recall that p=42 in some embodiments), resulting in the small-n-large-p problem.

At operation 604, the relationship between a selected engagement metric and one or more emotion categories is determined based upon the determined functions. Any of several approaches can be used to solve the statistical model, e.g., forward stepwise regression (Bendel, Robert B., and A. A. Afifi (1977), "Comparison of Stopping Rules in Forward Stepwise Regression," Journal of the American Statistical Association, 72 (357), 46-53; Pope and Webster 1972), all-subset regression (Berk, K. N. (1978), "Comparing Subset Regression Procedures," Technometrics, 20(1), 1-6; Gatu, Cristian, and Erricos John Kontoghiorghes (2006), "Branch-and-Bound Algorithms for Computing the Best-Subset Regression Models," Journal of Computational and Graphical Statistics, 15(1), 139-156), etc. Some example embodiments are configured to address this variable selection problem using forward stagewise regression (Hastie et al. 2007, incorporated by reference herein in its entirety), a method that has close relationship with the lasso and infinitesimal forward stepwise regression. The intuition is straightforward; when searching for a model (and estimating the associated regression coefficients), the forward stagewise regression methodology appends an additive penalty term to the objective function, thereby penalizing large values of regression coefficients. Thus, the estimated regression coefficients are reduced ("shrunk") towards zero and are generally more accurate than the corresponding coefficients estimated using ordinary least squares_regression. The output of forward stagewise regression directly corresponds to the desired output, e.g., an ordered sequence of emotion categories that matter in terms of driving the focal engagement metric, from the most important one to the least important one, while also estimating the regression coefficient for each of the relevant emotion categories. As discussed earlier, the final supervised learning process used in example embodiments is a variant of a class of algorithm known as stagewise linear regression, which automatically identify the best subset of variables that are more predictive of a certain KPI. The approach in example embodiments differs from the standard stagewise linear regression implementation by also incorporating some prior knowledge about the directionality of each emotion (e.g., "love" should not be negatively related to a KPI), thereby doing a constrained optimization rather than unconstrained search. Results indicate that embodiments produce results that have higher face validity than the standard stagewise linear regression. In certain example embodiments, a function library such as the lars( ) library in R may be used to implement forward stagewise regression.

After operation 604, process 600 is complete.

Figure 7:
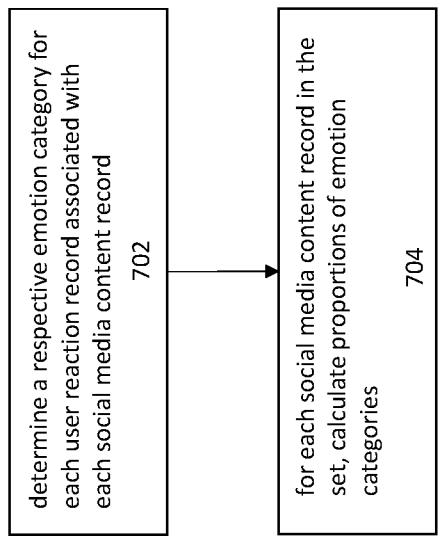
FIG. 7 is a flowchart showing forming of representations of the emotion categories and engagement metrics in accordance with certain example embodiments.

FIG. 7 is a flowchart showing a process 700 for forming representations of the emotion categories and engagement metrics in accordance with certain example embodiments. Process 700 may be executed in certain example embodiments when assigning at least one emotion category at operation 508 of process 500.

After entering process 700, at operation 702, one or more respective emotion categories are determined from the emotion category database for each of the one or more user reaction records associated with each social media content record in the set. The assignment of emotion categories to a social media content record may be made by assigning a corresponding emotion category for each emotion token already associated with any user reaction to that social media content record. In certain example embodiments, a database of emotion categories maintains a mapping between emotion tokens and emotion categories.

At operation 704, for each social media content record in the set, proportions of emotion categories are calculated based on the determined emotion categories of the one or more user reaction records associated with each social media content record. As described above, representing emotion categories in terms of proportion rather than raw counts provides a normalized data set for the learning process.

After operation 704, process 700 is complete and each of the social media content records is associated with a selected engagement metric and one or more emotion categories expressed in terms of a percentage proportion.

Figure 8:
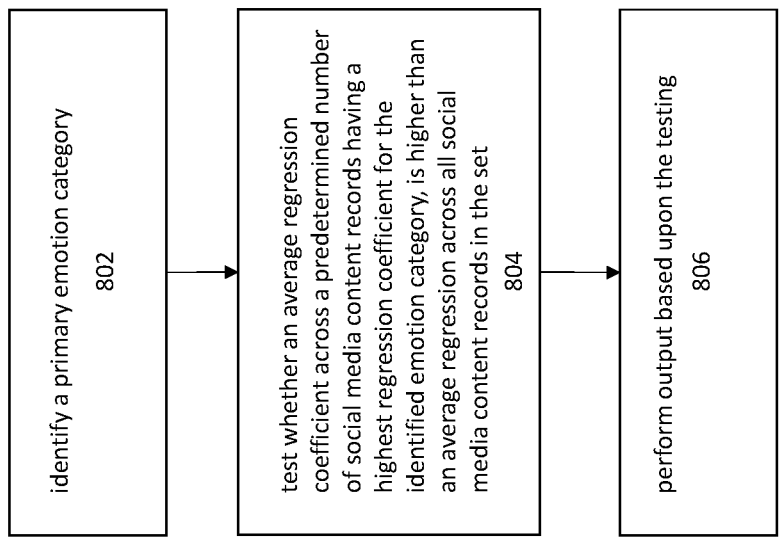
FIG. 8 is a flowchart of a verification of the supervised learning output performed in accordance with certain example embodiments.

FIG. 8 is a flowchart of a process 800 for verification of the supervised learning output performed in accordance with certain example embodiments. Process 800 may be executed in example embodiments when performing operation 512 verifying the determined relationship.

In an example embodiment, after obtaining the output from forward stagewise regression, a step further may be taken to verify that identified "priority emotion", i.e., the most important emotion, by running what is referred to herein as a "part vs. whole" test. Specifically, suppose the identified primary emotion is "love". In the part vs. whole test, the median KPI across all posts is compared against the median KPI across the top 5 posts ordered by the priority emotion ("love"). If the estimated regression coefficient for "love" is positive, it can reasonably be expected that the median KPI across the top 5 posts ordered by the priority emotion ("love") should be significantly higher than the median KPI across all posts. Thus, the "part vs. whole" test not only provides an additional "gut check" against the result of the forward stagewise regression, but also provides the end user with a sense of how big the magnitude of the effect potentially is. For example, if the magnitude difference between the two medians is small, the user may decide that the effect is not economically significant though it may be significant statistically.

After entering the process 800, at operation 802, a primary emotion category is identified in the assigned emotion categories. The primary emotion category may be selected as the emotion category with the highest impact—in some embodiments the emotion category with the highest coefficient after the learning process.

At operation 804, a test is performed as to whether an average regression coefficient for the identified emotion category for the median engagement metric across a predetermined number of social media content records having a highest regression coefficient for the identified emotion category, is higher than an average regression coefficient for the identified emotion category for the median engagement metric across all social media content records in the set.

At operation 806, the outputting is performed only if the regression coefficient for the identified emotion category is positive and the test is true or the regression coefficient for the identified emotion category is negative and the test is false.

After operation 806, process 800 is complete.

One example output with respect to a Facebook® page was described above in relation to FIG. 4. Several additional illustrative results are described below.

In an analysis of Facebook® Web address "HISTORY" according to an example embodiment, 180 posts were analyzed and "interesting" (+), "crazy" (+) and "love" (+) were presented as the ordered set of emotion categories with associated direction of the relationship with the key engagement metric selected as reach. The category "interesting" was identified as the priority emotion category. The estimated coefficient for the priority emotion is calculated as +2.66% (e.g., for 1% increase in "interesting", one expects +2.66% increase in expected reach). It was also indicated that the part vs. whole test was passed. The overall median reach was at 821,743, whereas the median reach of "top 5" posts ordered by percentage priority emotion was at 1,118,704 (e.g., +36.14% compared to overall median).

In an analysis of the Facebook® web address "AtTheKnick," according to an example embodiment, 141 posts were analyzed and "excited" (+), "dislike" (−) and "good" (−) were listed as the ordered set of emotion categories with associated direction of the relationship with the key engagement metric selected as reach. The category "excited" was identified as the priority emotion category. The estimated coefficient for the priority emotion is calculated as +0.42% (e.g., for 1% increase in "excited", one expects +0.42% increase in expected reach). It was also indicated that the part vs. whole test was passed. The overall median reach was at 37,075, whereas the median reach of "top 5" posts, ordered by percentage priority emotion, was at 37,452 (e.g., +1.02% compared to overall median).

In an analysis of the Facebook® web address "enews," according to an example embodiment output, 221 posts were analyzed, and "love" (+), "congrats" (+) and "excited" (+) were listed as the ordered set of emotion categories with associated direction of the relationship with the key engagement metric selected as reach. The category "love" was identified as the priority emotion category. The estimated coefficient for the priority emotion is calculated as +0.13% (e.g., for 1% increase in "love", one expects +0.13% increase in expected reach). It was also indicated that the part vs. whole test was passed. The overall median reach was at 453,378, whereas the median reach of "top 5" post, ordered by percent priority emotion is at 551,845 (e.g., +21.70% compared to overall median).

In an analysis of the Facebook® web address "refinery29," according to an example embodiment, 299 posts were analyzed, and "love" (+), "good" (+) and "funny" (+) were listed as the ordered set of emotion categories with associated direction of the relationship with the key engagement metric selected as reach. The category "love" was identified as the priority emotion category. The estimated coefficient for the priority emotion is calculated as +0.61% (e.g., for 1% increase in "love", one expects +0.61% increase in expected reach). It was also indicated that the part vs. whole test was passed. The overall median reach was at 272,606, whereas the median reach of "top 5" post, ordered by percentage priority emotion is at 810,961 (e.g., +2.97% compared to overall median).

Experiments such as those above conducted using example embodiments indicate that the more "positive" emotions (e.g., love, excited, interesting) are positively related to the focal engagement metric, while more "negative" emotions (e.g., dislike, boring) are negatively related to the focal engagement metric. The magnitude of the estimated regression coefficient for the priority emotion varies based on the sample analyzed, but generally falls within the range of +/−5%, which lends some face validity. Further, around 90% of the time, when the algorithm identifies a priority emotion, the pass vs. whole test would give a "passing" result, providing convergent evidence.

In the examples described herein, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using application specific integrated circuitry (ASIC), and/or using one or more digital signal processors (DSPs). The software program instructions and data may be stored on a computer-readable storage medium and when the instructions are executed by a computer or other suitable processor control, the computer or processor performs the functions. Although databases may be depicted herein as tables, other formats (including relational databases, object-based models, and/or distributed databases) may be used to store and manipulate data.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the technology, and does not imply that the illustrated process is preferred.

Processors, memory, network interfaces, I/O interfaces, and displays noted above are, or include, hardware devices (for example, electronic circuits or combinations of circuits) that are configured to perform various different functions for a computing device, such as computer 102.

In some embodiments, each or any of the processors 104 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). In some embodiments, each or any of the processors uses an instruction set architecture such as x86 or Advanced RISC Machine (ARM).

In some embodiments, each or any of the memory devices 106 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors. Memory devices are examples of non-volatile computer-readable storage media.

In some embodiments, each or any of the network interface devices 108 includes one or more circuits (such as a baseband processor and/or a wired or wireless transceiver), and implements layer one, layer two, and/or higher layers for one or more wired communications technologies (such as Ethernet (IEEE 802.3) and/or wireless communications technologies (such as Bluetooth®, WiFi® (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces in IO interfaces 110 is or includes one or more circuits that receive data from the processors 104, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device, which displays the image data. Alternatively or additionally, in some embodiments, each or any of the display interfaces is or includes, for example, a video card, video adapter, or graphics processing unit (GPU).

In some embodiments, each or any of the user input adapters in I/O interfaces 110 is or includes one or more circuits that receive and process user input data from one or more user input devices that are included in, attached to, or otherwise in communication with the computing device 102, and that output data based on the received input data to the processors 104. Alternatively or additionally, in some embodiments each or any of the user input adapters is or includes, for example, a PS/2 interface, a USB interface, a touchscreen controller, or the like; and/or the user input adapters facilitate input from user input devices such as a keyboard, mouse, trackpad, touchscreen, etc.

Various forms of computer readable media/transmissions may be involved in carrying data (e.g., sequences of instructions) to a processor. For example, data may be (i) delivered from a memory to a processor; (ii) carried over any type of transmission medium (e.g., wire, wireless, optical, etc.); (iii) formatted and/or transmitted according to numerous formats, standards or protocols, such as Ethernet (or IEEE 802.3), ATP, Bluetooth®, and TCP/IP, TDMA, CDMA, 3G, etc.; and/or (iv) encrypted to ensure privacy or prevent fraud in any of a variety of ways well known in the art.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor execute instructions that may be tangibly stored on a computer readable storage medium.

As used herein, the term "non-transitory computer-readable storage medium" includes a register, a cache memory, a ROM, a semiconductor memory device (such as a DRAM, S-RAM, or other RAM), a magnetic medium such as a flash memory, a hard disk, a magneto-optical medium, an optical medium such as a CD-ROM, a DVD, or Blu-Ray Disc®, or other type of device for non-transitory electronic data storage. The term "non-transitory computer-readable storage medium" does not include a transitory, propagating electromagnetic signal.

When it is described in this document that an action "may," "can," or "could" be performed, that a feature or component "may," "can," or "could" be included in or is applicable to a given context, that a given item "may," "can," or "could" possess a given attribute, or whenever any similar phrase involving the term "may," "can," or "could" is used, it should be understood that the given action, feature, component, attribute, etc. is present in at least one embodiment, though is not necessarily present in all embodiments.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for determining effectiveness of content posted on a social media network, comprising:
   a memory;
   a network communication interface; and
   a processor configured to, in conjunction with the memory and the network communication interface, perform operations comprising:
      receiving a set of social media content records posted to a network location and, for each social media content record in the set, one or more associated user reaction records posted in response to the social media content record;
      associating at least one emotion token from an emotion token database with each received user reaction record;
      assigning, to each social media content record in the set and in accordance with the at least one emotion token associated with said each social media content record, at least one emotion category from an emotion category database;
      obtaining one or more engagement metrics for each social media content record in the set, wherein each engagement metric represents a performance parameter of said each social media content record;
      determining, based upon the obtained one or more engagement metrics and the assigned at least one emotion category of respective social media content records in the set, a relationship between at least one engagement metric and at least one emotion category, wherein determining the relationship comprises:
         for each social media content record in the set, determining a function relating the determined one or more engagement metrics and the assigned at least one emotion category by performing supervised machine learning based on regression to determining the relationship; and
         determining the relationship based upon the determined functions; and
      outputting the determined relationship,
      wherein the supervised machine learning comprises determining a regression coefficient associated with the assigned at least one emotion category, wherein the determining a regression coefficient comprises determining an ordered set of regression coefficients, wherein the determining an ordered set of regression coefficients comprises reducing risk of overfitting, and wherein the determining an ordered set of regression coefficients is performed in accordance with forward stagewise regression.

2. The system according to claim 1, wherein said assigning at least one emotion category comprises:
   determining a respective emotion category from the emotion category database for each of the one or more user reaction records associated with said each social media content record in the set; and
   for each social media content record in the set, calculating proportions of emotion categories based on said determined emotion categories of said one or more user reaction records associated with said each social media content record.

3. The system according to claim 1, wherein the emotion category database associates each emotion category with one or more emotion tokens.

4. The system according to claim 1, wherein said obtaining the one or more engagement metrics comprises transforming values associated with each of said engagement metrics.

5. The system according to claim 4, wherein said transforming comprises automatically selecting a transform function based on characteristics of each engagement metric.

6. The system according to claim 1, wherein the processor is further configured to verify the determined relationship, and to output the verified relationship.

7. The system according to claim 1, wherein the processor is further configured to apply a time-based filter to the emotion category database, wherein the assigned at least one emotion category is selected from the emotion category database after the filter is applied.

8. The system according to claim 1, wherein the obtained one or more engagement metrics are selected from data within a predetermined time window.

9. The system according to claim 1, further comprising at least one of
   an emotion token database storing emotion tokens; and
   an emotion category database storing emotion categories, wherein each emotion category is associated with one or more emotion tokens.

10. The system according to claim 1, wherein the outputting the determined relationship includes outputting an ordered set of emotion categories that are predictive of an engagement metric and a directionality of their relationship.

11. A system for determining effectiveness of content posted on a social media network, comprising:
   a memory;
   a network communication interface; and
   a processor configured to, in conjunction with the memory and the network communication interface, perform operations comprising:
      receiving a set of social media content records posted to a network location and, for each social media content record in the set, one or more associated user reaction records posted in response to the social media content record;
      associating at least one emotion token from an emotion token database with each received user reaction record;
      assigning, to each social media content record in the set and in accordance with the at least one emotion token associated with said each social media content record, at least one emotion category from an emotion category database;
      obtaining one or more engagement metrics for each social media content record in the set, wherein each engagement metric represents a performance parameter of said each social media content record;
      determining, based upon the obtained one or more engagement metrics and the assigned at least one emotion category of respective social media content records in the set, a relationship between at least one engagement metric and at least one emotion category,
   wherein the processor is further configured to verify the determined relationship, and to output the verified relationship,
   wherein said verifying the determined relationship comprises:
      identifying a primary emotion category in the assigned emotion categories;
      testing whether an average regression coefficient for the identified emotion category for the median engagement metric across a predetermined number of social media content records having a highest regression coefficient for the identified emotion category, is higher that an average regression coefficient for the identified emotion category for the median engagement metric across all social media content records in the set; and
      performing the outputting only if the regression coefficient for the identified emotion category is positive and the test is true or the regression coefficient for the identified emotion category is negative and the test is false.

12. A method, comprising:
   receiving, using a processor, a set of social media content records posted to a network location and, for each social media content record in the set, one or more associated user reaction records posted in response to the social media content record;
   associating at least one emotion token from an emotion token database with each received user reaction record;
   assigning, to each social media content record in the set and in accordance with the at least one emotion token associated with said each social media content record, at least one emotion category from an emotion category database;
   obtaining one or more engagement metrics for each social media content record in the set, wherein each engagement metric represents a performance parameter of said each social media content record;
   determining, based upon the obtained one or more engagement metrics and the assigned at least one emotion category of respective social media content records in the set, a relationship between at least one engagement metric and at least one emotion category, wherein determining the relationship comprises:
      for each social media content record in the set, determining a function relating the determined one or more engagement metrics and the assigned at least one emotion category by performing supervised machine learning based on regression to determining the relationship; and
      determining the relationship based upon the determined functions; and
   outputting the determined relationship,
   wherein the supervised machine learning comprises determining a regression coefficient associated with the assigned at least one emotion category, wherein the determining a regression coefficient comprises determining an ordered set of regression coefficients, wherein the determining an ordered set of regression coefficients comprises reducing risk of overfitting, and wherein the determining an ordered set of regression coefficients is performed in accordance with forward stagewise regression.

13. A non-transitory computer readable storage medium having instructions stored thereon that, when executed by a computer, causes the computer to perform operations comprising:
   receiving a set of social media content records posted to a network location and, for each social media content record in the set, one or more associated user reaction records posted in response to the social media content record;
   associating at least one emotion token from an emotion token database with each received user reaction record;
   assigning, to each social media content record in the set and in accordance with the at least one emotion token associated with said each social media content record, at least one emotion category from an emotion category database;
   obtaining one or more engagement metrics for each social media content record in the set, wherein each engagement metric represents a performance parameter of said each social media content record;
   determining, based upon the obtained one or more engagement metrics and the assigned at least one emotion category of respective social media content records in the set, a relationship between at least one engagement metric and at least one emotion category, wherein determining the relationship comprises:
      for each social media content record in the set, determining a function relating the determined one or more engagement metrics and the assigned at least one emotion category by performing supervised machine learning based on regression to determining the relationship; and
      determining the relationship based upon the determined functions; and
   outputting the determined relationship,
   wherein the supervised machine learning comprises determining a regression coefficient associated with the assigned at least one emotion category, wherein the determining a regression coefficient comprises determining an ordered set of regression coefficients, wherein the determining an ordered set of regression coefficients comprises reducing risk of overfitting, and wherein the determining an ordered set of regression coefficients is performed in accordance with forward stagewise regression.

14. A method comprising:

receiving a set of social media content records posted to a network location and, for each social media content record in the set, one or more associated user reaction records posted in response to the social media content record;

associating at least one emotion token from an emotion token database with each received user reaction record;

assigning, to each social media content record in the set and in accordance with the at least one emotion token associated with said each social media content record, at least one emotion category from an emotion category database;

obtaining one or more engagement metrics for each social media content record in the set, wherein each engagement metric represents a performance parameter of said each social media content record;

determining, based upon the obtained one or more engagement metrics and the assigned at least one emotion category of respective social media content records in the set, a relationship between at least one engagement metric and at least one emotion category, wherein the method further comprises verifying the determined relationship, and to outputting the verified relationship, and wherein said verifying the determined relationship comprises:

identifying a primary emotion category in the assigned emotion categories;

testing whether an average regression coefficient for the identified emotion category for the median engagement metric across a predetermined number of social media content records having a highest regression coefficient for the identified emotion category, is higher that an average regression coefficient for the identified emotion category for the median engagement metric across all social media content records in the set; and performing the outputting only if the regression coefficient for the identified emotion category is positive and the test is true or the regression coefficient for the identified emotion category is negative and the test is false.

* * * * *